(12) United States Patent
Tang et al.

(10) Patent No.: US 9,356,837 B2
(45) Date of Patent: May 31, 2016

(54) ELECTRONIC DEVICE HAVING NETWORK AUTO-SWITCHING FUNCTIONS AND NETWORK AUTO-SWITCHING METHOD UTILIZED IN ELECTRONIC DEVICE

(71) Applicant: Realtek Semiconductor Corp., HsinChu (TW)

(72) Inventors: Chung-Wen Tang, Miaoli County (TW); Liang-Wei Huang, Hsinchu (TW); Li-Han Liang, Taipei (TW); Ta-Chin Tseng, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 115 days.

(21) Appl. No.: 13/744,363

(22) Filed: Jan. 17, 2013

(65) Prior Publication Data

US 2013/0188518 A1     Jul. 25, 2013

(30) Foreign Application Priority Data

Jan. 20, 2012   (TW) .............................. 101102624 A (51) Int. Cl.
*H04L 12/28*      (2006.01)
*H04L 12/24*      (2006.01)
*H04L 12/26*      (2006.01)
*H04L 12/54*      (2013.01)

(52) U.S. Cl.
CPC ............... *H04L 41/12* (2013.01); *H04L 12/28* (2013.01); *H04L 12/2838* (2013.01); *H04L 12/5692* (2013.01); *H04L 43/0811* (2013.01)

(58) Field of Classification Search
CPC .................................................. H04L 12/2838

USPC ......................................................... 370/254
See application file for complete search history.

(56) References Cited

U.S. PATENT DOCUMENTS

| 6,381,151 B1 * | 4/2002 | Jang ........................... 363/21.01 |
| 2006/0098463 A1 * | 5/2006 | Baurle et al. ............... 363/21.01 |
| 2010/0109795 A1 | 5/2010 | Jones et al. |
| 2010/0172285 A1 | 7/2010 | Tokuyasu |
| 2010/0261510 A1 | 10/2010 | Rajamani |
| 2011/0096793 A1 * | 4/2011 | Bar-Niv et al. ............... 370/463 |
| 2012/0099600 A1 * | 4/2012 | Tsai ............................. 370/401 |

FOREIGN PATENT DOCUMENTS

| CN | 101796881 A | 8/2010 |
| TW | 200920040 | 5/2009 |

* cited by examiner

*Primary Examiner* — Huy D Vu
*Assistant Examiner* — Kevin Cunningham
(74) *Attorney, Agent, or Firm* — Winston Hsu; Scott Margo (57) ABSTRACT

The disclosure provides an electronic device having network auto-switching functions and a network auto-switching method utilized in an electronic device. The electronic device comprises: a first network connecting unit having a first network transmission specification; and a second network connecting unit having a second network transmission specification different from the first network transmission specification. The network auto-switching method comprises: utilizing a detecting unit for detecting network connecting statuses of the first network connecting unit and the second network connecting unit to generate a detecting result; utilizing a network access unit for determining to select the first network connecting unit or the second network connecting unit to perform a network connecting operation or to not perform the network connecting operation at least according to the detecting result.

20 Claims, 4 Drawing Sheets

| | | | | Original network connecting status of the network access unit 108 → | No link | Eth link | HEC link |
|---|---|---|---|---|---|---|---|
| LDM False | Prefer Eth | ~NWAY_rdy & ~AHEC | Condition 1 | | No link | No link | No link |
| | | NWAY_rdy & ~AHEC | Condition 2 | | Eth link | Eth link | No link |
| | | ~NWAY_rdy & AHEC | Condition 3 | | HEC link | No link | HEC link |
| | | NWAY_rdy & AHEC | Condition 4 | | Eth link | Eth link | No link |
| | Prefer HEC | ~NWAY_rdy & ~AHEC | Condition 5 | | No link | No link | No link |
| | | NWAY_rdy & ~AHEC | Condition 6 | | Eth link | Eth link | No link |
| | | ~NWAY_rdy & AHEC | Condition 7 | | HEC link | No link | HEC link |
| | | NWAY_rdy & AHEC | Condition 8 | | HEC link | No link | HEC link |
| | Fix Eth | ~NWAY_rdy & ~AHEC | Condition 9 | | No link | No link | No link |
| | | NWAY_rdy & ~AHEC | Condition 10 | | Eth link | Eth link | No link |
| | | ~NWAY_rdy & AHEC | Condition 11 | | No link | No link | No link |
| | | NWAY_rdy & AHEC | Condition 12 | | Eth link | Eth link | No link |
| | Fix HEC | ~NWAY_rdy & ~AHEC | Condition 13 | | No link | No link | No link |
| | | NWAY_rdy & ~AHEC | Condition 14 | | No link | No link | No link |
| | | ~NWAY_rdy & AHEC | Condition 15 | | HEC link | No link | HEC link |
| | | NWAY_rdy & AHEC | Condition 16 | | HEC link | No link | HEC link |
| LDM True | Prefer Eth | ~NWAY_rdy & ~AHEC | Condition 17 | | No link | No link | No link |
| | | NWAY_rdy & ~AHEC | Condition 18 | | Eth link | Eth link | No link |
| | | ~NWAY_rdy & AHEC | Condition 19 | | HEC link | No link | HEC link |
| | | NWAY_rdy & AHEC | Condition 20 | | Eth link | Eth link | HEC link |
| | Prefer HEC | ~NWAY_rdy & ~AHEC | Condition 21 | | No link | No link | No link |
| | | NWAY_rdy & ~AHEC | Condition 22 | | Eth link | Eth link | No link |
| | | ~NWAY_rdy & AHEC | Condition 23 | | HEC link | No link | HEC link |
| | | NWAY_rdy & AHEC | Condition 24 | | HEC link | Eth link | HEC link |
| | Fix Eth | ~NWAY_rdy & ~AHEC | Condition 25 | | No link | No link | No link |
| | | NWAY_rdy & ~AHEC | Condition 26 | | Eth link | Eth link | No link |
| | | ~NWAY_rdy & AHEC | Condition 27 | | No link | No link | HEC link |
| | | NWAY_rdy & AHEC | Condition 28 | | Eth link | Eth link | HEC link |
| | Fix HEC | ~NWAY_rdy & ~AHEC | Condition 29 | | No link | No link | No link |
| | | NWAY_rdy & ~AHEC | Condition 30 | | No link | Eth link | No link |
| | | ~NWAY_rdy & AHEC | Condition 31 | | HEC link | No link | HEC link |
| | | NWAY_rdy & AHEC | Condition 32 | | HEC link | Eth link | HEC link |

ELECTRONIC DEVICE HAVING NETWORK AUTO-SWITCHING FUNCTIONS AND NETWORK AUTO-SWITCHING METHOD UTILIZED IN ELECTRONIC DEVICE

BACKGROUND OF THE INVENTION

1. Field of the Invention

The present invention relates to an electronic device having network auto-switching functions and a network auto-switching method utilized in an electronic device.

2. Description of the Prior Art

The current high definition multimedia interface (HDMI) version 1.4 has a new function named HDMI Ethernet and Audio return Channel (HEAC), where the HEAC function can make a network receiver to transmit/receive HDMI Ethernet Channel (HEC) data signals and Audio Return Channel (ARC) data signals simultaneously. Therefore, the HDMI cable can be utilized to replace the conventional Ethernet cable.

Current system-provider companies (such as system-provider companies of the notebook computer or the Digital Versatile Disc (DVD) player) can not be sure that whether the customer's HDMI supports HDMI version 1.4 and Ethernet transmission, and thus the current system-provider companies will reserve the conventional Ethernet connector and the HDMI connector with the Ethernet function in the hardware. However, the current system-provider companies do not provide a function of automatically switching between two different network connecting modes mentioned above, and two media access control (MAC) layer control circuits and two physical layer (PHY) control circuits are required to be respectively set up in the hardware, and thus the hardware cost are increased a lot as the result.

SUMMARY OF THE INVENTION

It is therefore one of the objectives of the present invention to provide an electronic device having network auto-switching functions and a network auto-switching method utilized in an electronic device, wherein the electronic device and the network auto-switching method can automatically switch between two different network connecting modes, so as to solve the above problem.

In accordance with an embodiment of the present invention, an electronic device is disclosed. The electronic device comprises: a first network connecting unit, a second network connecting unit, a detecting unit, and a network access unit. The first network connecting unit has a first network transmission specification. The second network connecting unit has a second network transmission specification different from the first network transmission specification. The detecting unit is coupled to the first network connecting unit and the second network connecting unit, and utilized for detecting network connecting statuses of the first network connecting unit and the second network connecting unit to generate a detecting result. The network access unit is coupled to the detecting unit, the first network connecting unit, and the second network connecting unit, and utilized for determining to select the first network connecting unit or the second network connecting unit to perform a network connecting operation or to not perform the network connecting operation at least according to the detecting result.

In accordance with an embodiment of the present invention, a network auto-switching method utilized in an electronic device is disclosed. The electronic device comprises: a first network connecting unit having a first network transmission specification; and a second network connecting unit having a second network transmission specification different from the first network transmission specification, and the network auto-switching method comprises: utilizing a detecting unit to detect network connecting statuses of the first network connecting unit and the second network connecting unit to generate a detecting result; and utilizing a network access unit to determine to select the first network connecting unit or the second network connecting unit to perform a network connecting operation or to not perform the network connecting operation at least according to the detecting result.

Briefly summarized, in comparison of the prior art, the electronic device and the network auto-switching method disclosed by the present invention can automatically switch between two different network connecting modes, and only a media access control (MAC) layer control circuit and two physical layer (PHY) control circuits are required to be set up in the hardware, and thus the hardware cost can be reduced.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows a table of every condition of the state machine in FIG. 2.

DETAILED DESCRIPTION

Figure 1:
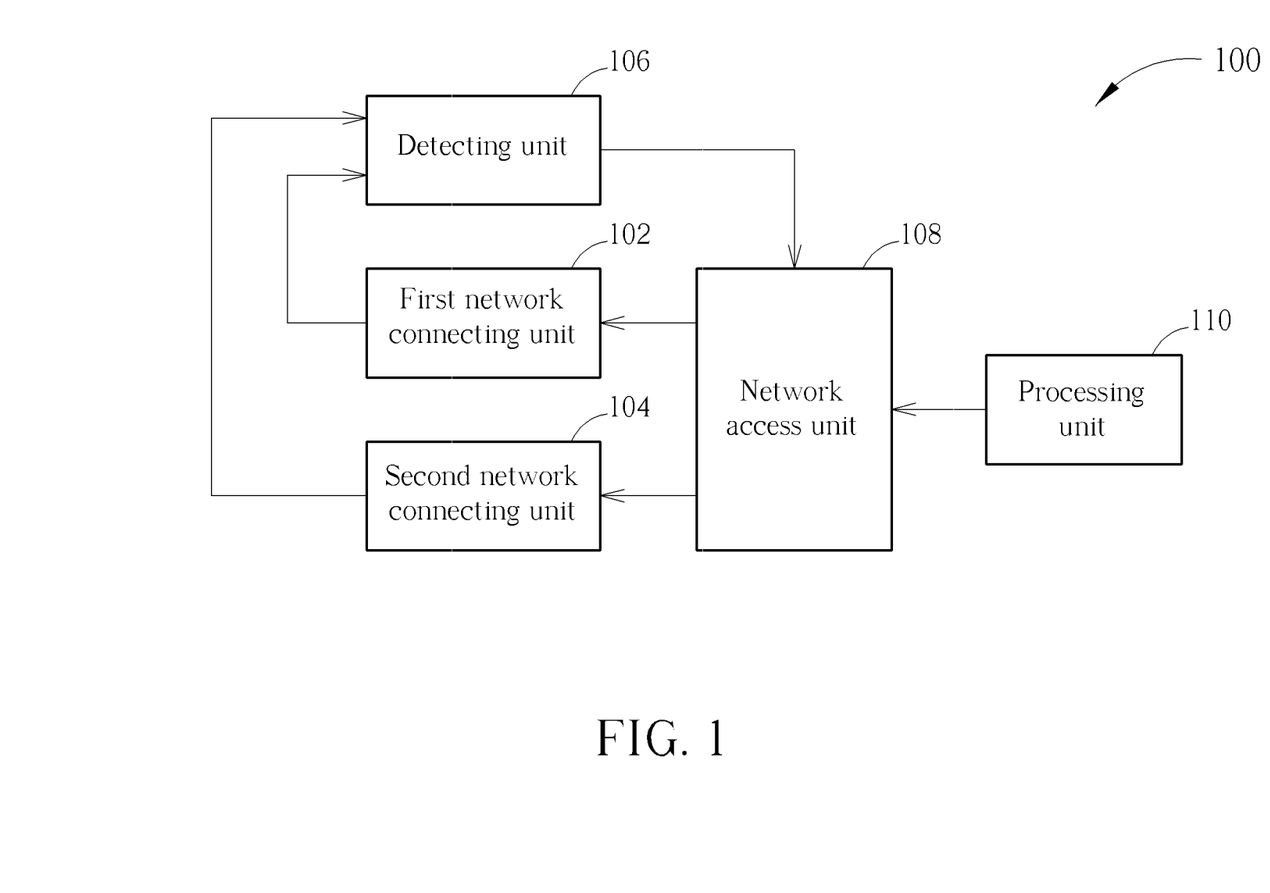
FIG. 1 shows a simplified block diagram of an electronic device in accordance with an embodiment of the present invention.

Please refer to FIG. 1. FIG. 1 shows a simplified block diagram of an electronic device 100 in accordance with an embodiment of the present invention, wherein the electronic device 100 can be a notebook computer or a Digital Versatile Disc (DVD) player. As shown in FIG. 1, the electronic device 100 comprises: a first network connecting unit 102, a second network connecting unit 104, a detecting unit 106, a network access unit 108, and a processing unit 110. The first network connecting unit 102 has a first network transmission specification. The second network connecting unit 104 has a second network transmission specification different from the first network transmission specification. For example, the first network transmission specification can be Ethernet, and the second network transmission specification can be high definition multimedia interface (HDMI) ethernet channel (HEC). Please note this is only for an illustrative purpose and is not meant to be a limitation of the disclosure. The detecting unit 106 is coupled to the first network connecting unit 102 and the second network connecting unit 104, and utilized for detecting network connecting statuses of the first network connecting unit 102 and the second network connecting unit 104 to generate a detecting result. The network access unit 108 is coupled to the detecting unit 106, the first network connecting unit 102, and the second network connecting unit 104, and utilized for determining to select the first network connecting unit 102 or the second network connecting unit 104 to perform a network connecting operation or to not perform the network connecting operation at least according to the detecting result. The processing unit 110 is coupled to the network access unit 108, and utilized for adjusting at least a network setting parameter of the network access unit 108, wherein the network access unit 108 determines to select the first network connecting unit 102 or the second network connecting unit 104 to perform the network connecting operation or to not perform the network connecting operation according to the detecting result and the at least a network setting parameter.

In an embodiment of the present invention, the at least a network setting parameter comprises: a current connection priority parameter, a priority selecting connection parameter, and a fixed selecting connection parameter. When the current connection priority parameter has a first current connection priority setting value (such as 0), the network access unit 108 will not select the current selected first network connecting unit 102 or the current selected second network connecting unit 104 with priority. When the current connection priority parameter has a second current connection priority setting value (such as 1), the network access unit 108 will select the current selected first network connecting unit 102 or the current selected second network connecting unit 104 with priority. When the priority selecting connection parameter has a first priority selecting connection setting value (such as 0), the network access unit 108 will select the first network connecting unit 102 with priority; when the priority selecting connection parameter has a second priority selecting connection setting value (such as 1), the network access unit 108 will select the second network connecting unit 104 with priority; when the fixed selecting connection parameter has a first fixed selecting connection setting value (such as 0), the network access unit 108 will select the first network connecting unit 102 fixedly; and when the fixed selecting connection parameter has a second fixed selecting connection setting value (such as 1), the network access unit 108 will select the second network connecting unit 104 fixedly. In addition, please note that the above embodiment is only for an illustrative purpose and is not meant to be a limitation of the disclosure. For example, all of the first current connection priority setting value, the second current connection priority setting value, the first priority selecting connection setting value, the second priority selecting connection setting value, the first fixed selecting connection setting value, and the second fixed selecting connection setting value can be designed according to other different requirements. Moreover, the network access unit 108 also can determine to select the first network connecting unit 102 or the second network connecting unit 104 to perform a network connecting operation or to not perform the network connecting operation according to a current network connecting status of the network access unit 108 and the detecting result.

Figure 2:
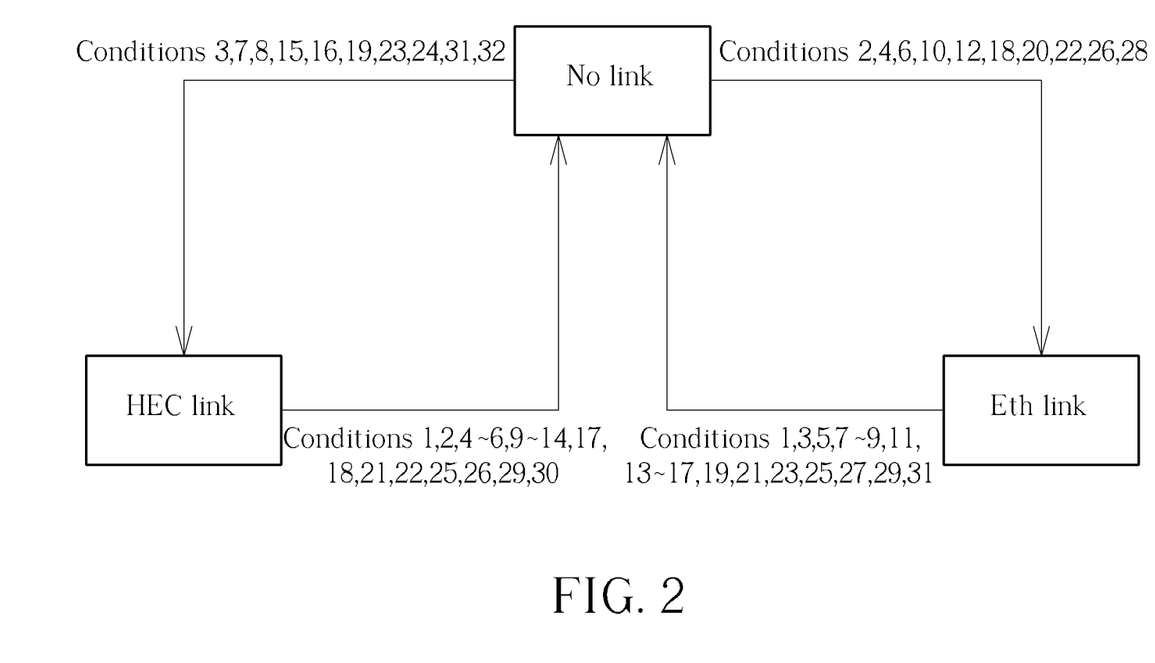
FIG. 2 shows a simplified diagram of the state machine in accordance with an embodiment of the present invention.

In an embodiment of the present invention, the network auto-switching operation mentioned above is performed by utilizing a state machine realized by a software inside the network access unit 108. Please refer to FIG. 2 and FIG. 3 together. FIG. 2 shows a simplified diagram of the state machine in accordance with an embodiment of the present invention, and FIG. 3 shows a table of every condition of the state machine in FIG. 2. The "LDM False" in FIG. 3 represents that the current connection priority parameter has the first current connection priority setting value. The "LDM True" in FIG. 3 represents that the current connection priority parameter has the second current connection priority setting value. The "Prefer Eth" in FIG. 3 represents that the priority selecting connection parameter has the first priority selecting connection setting value. The "Prefer HEC" in FIG. 3 represents that the priority selecting connection parameter has the second priority selecting connection setting value. The "Fix Eth" in FIG. 3 represents that the fixed selecting connection parameter has the first fixed selecting connection setting value. The "Fix HEC" in FIG. 3 represents that the fixed selecting connection parameter has the second fixed selecting connection setting value. The "~NWAY_rdy & ~AHEC" in FIG. 3 represents that the first network connecting unit 102 and the second network connecting unit 104 are not capable of connecting network. The "NWAY_rdy & ~AHEC" in FIG. 3 represents that the first network connecting unit 102 is capable of connecting network and the second network connecting unit 104 is not capable of connecting network. The "~NWAY_rdy & AHEC" in FIG. 3 represents that the first network connecting unit 102 is not capable of connecting network and the second network connecting unit 104 is capable of connecting network, and the "NWAY_rdy & AHEC" in FIG. 3 represents that the first network connecting unit 102 and the second network connecting unit 104 are both capable of connecting network. The "No link" in FIG. 2 and FIG. 3 represents that the network access unit 108 does not perform the network connecting operation. The "Eth link" in FIG. 2 and FIG. 3 represents that the network access unit 108 selects the first network connecting unit 102 to perform the network connecting operation, and the "HEC link" in FIG. 2 and FIG. 3 represents that the network access unit 108 selects the second network connecting unit 104 to perform the network connecting operation. As shown in FIG. 2 and FIG. 3, when the conditions 2, 4, 6, 10, 12, 18, 20, 22, 26, and 28 in FIG. 3 are satisfied, if the original network connecting status of the network access unit 108 is "No link", then the network connecting status of the network access unit 108 will be switched to "Eth link". When the conditions 3, 7, 8, 15, 16, 19, 23, 24, 31, and 32 in FIG. 3 are satisfied, if the original network connecting status of the network access unit 108 is "No link", then the network connecting status of the network access unit 108 will be switched to "HEC link". When the conditions 1, 2, 4-6, 9-14, 17, 18, 21, 22, 25, 26, 29, and 30 in FIG. 3 are satisfied, if the original network connecting status of the network access unit 108 is "HEC link", then the network connecting status of the network access unit 108 will be switched to "No link". When the conditions 1, 3, 5, 7-9, 11, 13-17, 19, 21, 23, 25, 27, 29, and 31 in FIG. 3 are satisfied, if the original network connecting status of the network access unit 108 is "Eth link", then the network connecting status of the network access unit 108 will be switched to "No link".

In addition, please note that the above embodiment is only for an illustrative purpose and is not meant to be a limitation of the disclosure. For example, the state machine mentioned above can be designed according to other different requirements. Moreover, in the state machine of another embodiment in the present invention, when the conditions 2, 4, 6, 10, 12, 18, 22, and 26 in FIG. 3 are satisfied, if the original network connecting status of the network access unit 108 is "HEC link", then the network connecting status of the network access unit 108 can be directly switched to "Eth link", and is not required to be switched to "No link" first and then switched to "Eth link". When the conditions 3, 7, 8, 15, 16, 19, 23, and 31 in FIG. 3 are satisfied, if the original network connecting status of the network access unit 108 is "Eth link", then the network connecting status of the network access unit 108 can be directly switched to "HEC link", and is not required to be switched to "No link" first and then switched to "HEC link" In other words, when the network access unit 108 determines to select the first network connecting unit 102 or the second network connecting unit 104 to perform the network connecting operation or to not perform the network connecting operation according to the detecting result, the current connection priority parameter, and the priority selecting connection parameter, and the current connection priority parameter and the priority selecting connection parameter respectively has the first current connection priority setting value (such as 0) and the first priority selecting connection setting value, if the first network connecting unit 102 and the second network connecting unit 104 both are capable of connecting network, then the network access unit 108 will select the first network connecting unit 102 to perform the network connecting operation; if the first network connecting unit 102 is capable of connecting network and the second network connecting unit 104 is not capable of connecting network, then the network access unit 108 will select the first network connecting unit 102 to perform the network connecting operation; if the first network connecting unit 102 is not capable of connecting network and the second network connecting unit 104 is capable of connecting network, then the network access unit 108 will select the second network connecting unit 104 to perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the priority selecting connection parameter, and the current connection priority parameter and the priority selecting connection parameter respectively has the first current connection priority setting value and the second priority selecting connection setting value, if the first network connecting unit 102 and the second network connecting unit 104 both are capable of connecting network, then the network access unit 108 will select the second network connecting unit 104 to perform the network connecting operation; if the first network connecting unit 102 is capable of connecting network and the second network connecting unit 104 is not capable of connecting network, then the network access unit 108 will select the first network connecting unit 102 to perform the network connecting operation; if the first network connecting unit 102 is not capable of connecting network and the second network connecting unit 104 is capable of connecting network, then the network access unit 108 will select the second network connecting unit 104 to perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the fixed selecting connection parameter, and the current connection priority parameter and the priority selecting connection parameter respectively has the first current connection priority setting value and the first fixed selecting connection setting value, if the first network connecting unit 102 and the second network connecting unit 104 both are capable of connecting network, then the network access unit 108 will select the first network connecting unit 102 to perform the network connecting operation; if the first network connecting unit 102 is capable of connecting network and the second network connecting unit 104 is not capable of connecting network, then the network access unit 108 will select the first network connecting unit 102 to perform the network connecting operation; if the first network connecting unit 102 is not capable of connecting network and the second network connecting unit 104 is capable of connecting network, then the network access unit 108 will select to not perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the fixed selecting connection parameter, and the current connection priority parameter and the priority selecting connection parameter respectively has the first current connection priority setting value and the second fixed selecting connection setting value, if the first network connecting unit 102 and the second network connecting unit 104 both are capable of connecting network, then the network access unit 108 will select the second network connecting unit 104 to perform the network connecting operation; if the first network connecting unit 102 is capable of connecting network and the second network connecting unit 104 is not capable of connecting network, then the network access unit 108 will select to not perform the network connecting operation; if the first network connecting unit 102 is not capable of connecting network and the second network connecting unit 104 is capable of connecting network, then the network access unit 108 will select the second network connecting unit 104 to perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the priority selecting connection parameter, and the current connection priority parameter and the priority selecting connection parameter respectively has the second current connection priority setting value and the first priority selecting connection setting value, if the first network connecting unit 102 and the second network connecting unit 104 both are capable of connecting network and the network access unit 108 is currently selecting the second network connecting unit 104 to perform the network connecting operation, then the network access unit 108 will continue to select the second network connecting unit 104 to perform the network connecting operation; if the first network connecting unit 102 and the second network connecting unit 104 both are capable of connecting network and the network access unit 108 is not currently selecting the second network connecting unit 104 to perform the network connecting operation, then the network access unit 108 will select the first network connecting unit 102 to perform the network connecting operation; if the first network connecting unit 102 is capable of connecting network and the second network connecting unit 104 is not capable of connecting network, then the network access unit 108 will select the first network connecting unit 102 to perform the network connecting operation; if the first network connecting unit 102 is not capable of connecting network and the second network connecting unit 104 is capable of connecting network, then the network access unit 108 will select the second network connecting unit 104 to perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the priority selecting connection parameter, and the current connection priority parameter and the priority selecting connection parameter respectively has the second current connection priority setting value and the second priority selecting connection setting value, if the first network connecting unit 102 and the second network connecting unit 104 both are capable of connecting network and the network access unit 108 is currently selecting the first network connecting unit 102 to perform the network connecting operation, then the network access unit 108 will continue to select the first network connecting unit 102 to perform the network connecting operation; if the first network connecting unit 102 and the second network connecting unit 104 both are capable of connecting network and the network access unit 108 is not currently selecting the first network connecting unit 102 to perform the network connecting operation, then the network access unit 108 will select the second network connecting unit 104 to perform the network connecting operation; if the first network connecting unit 102 is capable of connecting network and the second network connecting unit 104 is not capable of connecting network, then the network access unit 108 will select the first network connecting unit 102 to perform the network connecting operation; if the first network connecting unit 102 is not capable of connecting network and the second network connecting unit 104 is capable of connecting network, then the network access unit 108 will select the second network connecting unit 104 to perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the fixed selecting connection parameter, and the current connection priority parameter and the priority selecting connection parameter respectively has the second current connection priority setting value and the first fixed selecting connection setting value, if the first network connecting unit 102 and the second network connecting unit 104 both are capable of connecting network and the network access unit 108 is currently selecting the second network connecting unit 104 to perform the network connecting operation, then the network access unit 108 will continue to select the second network connecting unit 104 to perform the network connecting operation; if the first network connecting unit 102 and the second network connecting unit 104 both are capable of connecting network and the network access unit 108 is not currently selecting the second network connecting unit 104 to perform the network connecting operation, then the network access unit 108 will select the first network connecting unit 102 to perform the network connecting operation; if the first network connecting unit 102 is capable of connecting network and the second network connecting unit 104 is not capable of connecting network, then the network access unit 108 will select the first network connecting unit 102 to perform the network connecting operation; if the first network connecting unit 102 is not capable of connecting network and the second network connecting unit 104 is capable of connecting network and the network access unit 108 is currently selecting the second network connecting unit 104 to perform the network connecting operation, then the network access unit 108 will continue to select the second network connecting unit 104 to perform the network connecting operation; if the first network connecting unit 102 is not capable of connecting network and the second network connecting unit 104 is capable of connecting network and the network access unit 108 is not currently selecting the second network connecting unit 104 to perform the network connecting operation, then the network access unit 108 will select to not perform the network connecting operation; and if the first network connecting unit 102 and the second network connecting unit 104 are not capable of connecting network, then the network access unit 108 will select to not perform the network connecting operation. When the network access unit 108 determines to select the first network connecting unit 102 or the second network connecting unit 104 to perform the network connecting operation or to not perform the network connecting operation according to the detecting result, the current connection priority parameter, and the fixed selecting connection parameter, and the current connection priority parameter and the priority selecting connection parameter respectively has the second current connection priority setting value and the second fixed selecting connection setting value, if the first network connecting unit 102 and the second network connecting unit 104 both are capable of connecting network and the network access unit 108 is currently selecting the first network connecting unit 102 to perform the network connecting operation, then the network access unit 108 will continue to select the first network connecting unit 102 to perform the network connecting operation; if the first network connecting unit 102 and the second network connecting unit 104 both are capable of connecting network and the network access unit 108 is not currently selecting the first network connecting unit 102 to perform the network connecting operation, then the network access unit 108 will select the second network connecting unit 104 to perform the network connecting operation; if the first network connecting unit 102 is capable of connecting network and the second network connecting unit 104 is not capable of connecting network and the network access unit 108 is currently selecting the first network connecting unit 102 to perform the network connecting operation, then the network access unit 108 will continue to select the first network connecting unit 102 to perform the network connecting operation; if the first network connecting unit 102 is capable of connecting network and the second network connecting unit 104 is not capable of connecting network and the network access unit 108 is not currently selecting the first network connecting unit 102 to perform the network connecting operation, then the network access unit 108 will select to not perform the network connecting operation; if the first network connecting unit 102 is not capable of connecting network and the second network connecting unit 104 is capable of connecting network, then the network access unit 108 will select the second network connecting unit 104 to perform the network connecting operation; and if the first network connecting unit 102 and the second network connecting unit 104 are not capable of connecting network, then the network access unit 108 will select to not perform the network connecting operation.

Figure 4:
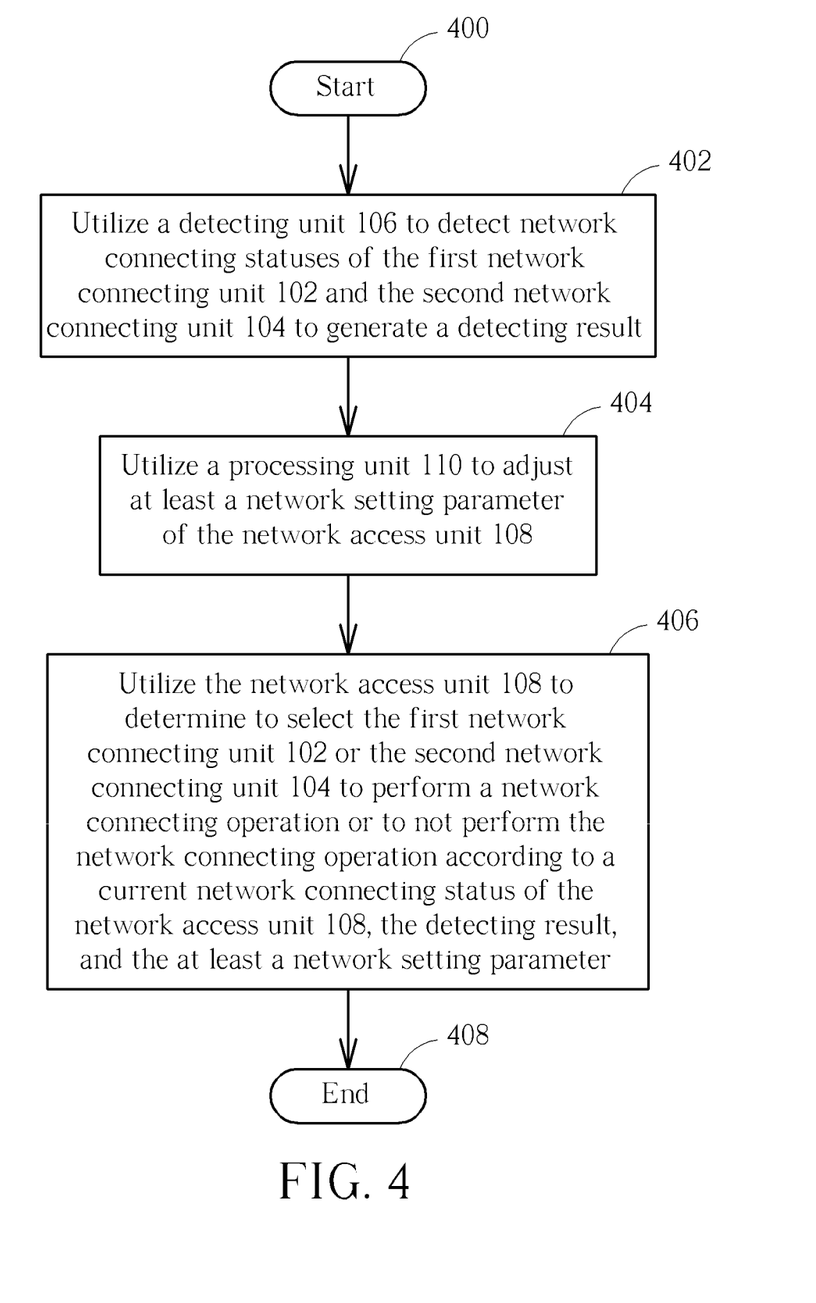
FIG. 4 shows an exemplary flowchart of the present invention showing a network auto-switching method utilized in an electronic device in accordance with the operations of the electronic device in FIG. 1.

Please refer to FIG. 4. FIG. 4 shows an exemplary flowchart of the present invention showing a network auto-switching method utilized in an electronic device in accordance with the above operations of the electronic device 100. Provided that substantially the same result is achieved, the steps of the process flowchart do not have to be in the exact order shown in FIG. 4 and need not be contiguous, meaning that other steps can be intermediate. The network auto-switching method of the present invention comprises the following steps:

Step 400: Start.

Step 402: Utilize a detecting unit 106 to detect network connecting statuses of the first network connecting unit 102 and the second network connecting unit 104 to generate a detecting result.

Step 404: Utilize a processing unit 110 to adjust at least a network setting parameter of the network access unit 108.

Step 406: Utilize the network access unit 108 to determine to select the first network connecting unit 102 or the second network connecting unit 104 to perform a network connecting operation or to not perform the network connecting operation according to a current network connecting status of the network access unit 108, the detecting result, and the at least a network setting parameter.

Step 408: End.

Briefly summarized, in comparison of the prior art, the electronic device and the network auto-switching method disclosed by the present invention can automatically switch between two different network connecting modes, and only a media access control (MAC) layer control circuit and two physical layer (PHY) control circuits are required to be set up in the hardware, and thus the hardware cost can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having network auto-switching functions, comprising:
   a first network connecting unit, having a first network transmission specification;
   a second network connecting unit, having a second network transmission specification different from the first network transmission specification;
   a detecting unit, coupled to the first network connecting unit and the second network connecting unit, for detecting network connecting statuses of the first network connecting unit and the second network connecting unit to generate a detecting result;
   a network access unit, coupled to the detecting unit, the first network connecting unit, and the second network connecting unit, for determining to select the first network connecting unit or the second network connecting unit to perform a network connecting operation or to not perform the network connecting operation at least according to the detecting result; and
   a processing unit, coupled to the network access unit, for adjusting at least one network setting parameter of the network access unit;
   wherein the network access unit determines to select the first network connecting unit or the second network connecting unit to perform the network connecting operation or to not perform the network connecting operation according to the detecting result and the at least one network setting parameter, and the at least one network setting parameter comprises: a current connection priority parameter, a priority selecting connection parameter, and a fixed selecting connection parameter; when the current connection priority parameter has a first current connection priority setting value, the network access unit will not select the current selected first network connecting unit or the current selected second network connecting unit with priority; when the current connection priority parameter has a second current connection priority setting value, the network access unit will select the current selected first network connecting unit or the current selected second network connecting unit with priority; when the priority selecting connection parameter has a first priority selecting connection setting value, the network access unit will select the first network connecting unit with priority; when the priority selecting connection parameter has a second priority selecting connection setting value, the network access unit will select the second network connecting unit with priority; when the fixed selecting connection parameter has a first fixed selecting connection setting value, the network access unit will select the first network connecting unit fixedly; and when the fixed selecting connection parameter has a second fixed selecting connection setting value, the network access unit will select the second network connecting unit fixedly;
   when the network access unit determines to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the first current connection priority setting value and the first priority selecting connection setting value, if the first network connecting unit and the second network connecting unit both are capable of connecting network, then the network access unit will select the first network connecting unit to perform the network connecting operation; if the first network connecting unit is capable of connecting network and the second network connecting unit is not capable of connecting network, then the network access unit will select the first network connecting unit to perform the network connecting operation; if the first network connecting unit is not capable of connecting network and the second network connecting unit is capable of connecting network, then the network access unit will select the second network connecting unit to perform the network connecting operation; and if the first network connecting unit and the second network connecting unit are not capable of connecting network, then the network access unit will select to not perform the network connecting operation.

2. The electronic device of claim 1, wherein when the network access unit determines to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the first current connection priority setting value and the second priority selecting connection setting value, if the first network connecting unit and the second network connecting unit both are capable of connecting network, then the network access unit will select the second network connecting unit to perform the network connecting operation; if the first network connecting unit is capable of connecting network and the second network connecting unit is not capable of connecting network, then the network access unit will select the first network connecting unit to perform the network connecting operation; if the first network connecting unit is not capable of connecting network and the second network connecting unit is capable of connecting network, then the network access unit will select the second network connecting unit to perform the network connecting operation; and if the first network connecting unit and the second network connecting unit are not capable of connecting network, then the network access unit will select to not perform the network connecting operation.

3. The electronic device of claim 1, wherein when the network access unit determines to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the first current connection priority setting value and the first fixed selecting connection setting value, if the first network connecting unit and the second network connecting unit both are capable of connecting network, then the network access unit will select the first network connecting unit to perform the network connecting operation; if the first network connecting unit is capable of connecting network and the second network connecting unit is not capable of connecting network, then the network access unit will select the first network connecting unit to perform the network connecting operation; if the first network connecting unit is not capable of connecting network and the second network connecting unit is capable of connecting network, then the network access unit will select to not perform the network connecting operation; and if the first network connecting unit and the second network connecting unit are not capable of connecting network, then the network access unit will select to not perform the network connecting operation.

4. The electronic device of claim 1, wherein when the network access unit determines to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the first current connection priority setting value and the second fixed selecting connection setting value, if the first network connecting unit and the second network connecting unit both are capable of connecting network, then the network access unit will select the second network connecting unit to perform the network connecting operation; if the first network connecting unit is capable of connecting network and the second network connecting unit is not capable of connecting network, then the network access unit will select to not perform the network connecting operation; if the first network connecting unit is not capable of connecting network and the second network connecting unit is capable of connecting network, then the network access unit will select the second network connecting unit to perform the network connecting operation; and if the first network connecting unit and the second network connecting unit are not capable of connecting network, then the network access unit will select to not perform the network connecting operation.

5. The electronic device of claim 1, wherein when the network access unit determines to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the second current connection priority setting value and the first priority selecting connection setting value, if the first network connecting unit and the second network connecting unit both are capable of connecting network and the network access unit is currently selecting the second network connecting unit to perform the network connecting operation, then the network access unit will continue to select the second network connecting unit to perform the network connecting operation; if the first network connecting unit and the second network connecting unit both are capable of connecting network and the network access unit is not currently selecting the second network connecting unit to perform the network connecting operation, then the network access unit will select the first network connecting unit to perform the network connecting operation; if the first network connecting unit is capable of connecting network and the second network connecting unit is not capable of connecting network, then the network access unit will select the first network connecting unit to perform the network connecting operation; if the first network connecting unit is not capable of connecting network and the second network connecting unit is capable of connecting network, then the network access unit will select the second network connecting unit to perform the network connecting operation; and if the first network connecting unit and the second network connecting unit are not capable of connecting network, then the network access unit will select to not perform the network connecting operation.

6. The electronic device of claim 1, wherein when the network access unit determines to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the second current connection priority setting value and the second priority selecting connection setting value, if the first network connecting unit and the second network connecting unit both are capable of connecting network and the network access unit is currently selecting the first network connecting unit to perform the network connecting operation, then the network access unit will continue to select the first network connecting unit to perform the network connecting operation; if the first network connecting unit and the second network connecting unit both are capable of connecting network and the network access unit is not currently selecting the first network connecting unit to perform the network connecting operation, then the network access unit will select the second network connecting unit to perform the network connecting operation; if the first network connecting unit is capable of connecting network and the second network connecting unit is not capable of connecting network, then the network access unit will select the first network connecting unit to perform the network connecting operation; if the first network connecting unit is not capable of connecting network and the second network connecting unit is capable of connecting network, then the network access unit will select the second network connecting unit to perform the network connecting operation; and if the first network connecting unit and the second network connecting unit are not capable of connecting network, then the network access unit will select to not perform the network connecting operation.

7. The electronic device of claim 1, wherein when the network access unit determines to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the second current connection priority setting value and the first fixed selecting connection setting value, if the first network connecting unit and the second network connecting unit both are capable of connecting network and the network access unit is currently selecting the second network connecting unit to perform the network connecting operation, then the network access unit will continue to select the second network connecting unit to perform the network connecting operation; if the first network connecting unit and the second network connecting unit both are capable of connecting network and the network access unit is not currently selecting the second network connecting unit to perform the network connecting operation, then the network access unit will select the first network connecting unit to perform the network connecting operation; if the first network connecting unit is capable of connecting network and the second network connecting unit is not capable of connecting network, then the network access unit will select the first network connecting unit to perform the network connecting operation; if the first network connecting unit is not capable of connecting network and the second network connecting unit is capable of connecting network and the network access unit is currently selecting the second network connecting unit to perform the network connecting operation, then the network access unit will continue to select the second network connecting unit to perform the network connecting operation; if the first network connecting unit is not capable of connecting network and the second network connecting unit is capable of connecting network and the network access unit is not currently selecting the second network connecting unit to perform the network connecting operation, then the network access unit will select to not perform the network connecting operation; and if the first network connecting unit and the second network connecting unit are not capable of connecting network, then the network access unit will select to not perform the network connecting operation.

8. The electronic device of claim 1, wherein when the network access unit determines to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the second current connection priority setting value and the second fixed selecting connection setting value, if the first network connecting unit and the second network connecting unit both are capable of connecting network and the network access unit is currently selecting the first network connecting unit to perform the network connecting operation, then the network access unit will continue to select the first network connecting unit to perform the network connecting operation; if the first network connecting unit and the second network connecting unit both are capable of connecting network and the network access unit is not currently selecting the first network connecting unit to perform the network connecting operation, then the network access unit will select the second network connecting unit to perform the network connecting operation; if the first network connecting unit is capable of connecting network and the second network connecting unit is not capable of connecting network and the network access unit is currently selecting the first network connecting unit to perform the network connecting operation, then the network access unit will continue to select the first network connecting unit to perform the network connecting operation; if the first network connecting unit is capable of connecting network and the second network connecting unit is not capable of connecting network and the network access unit is not currently selecting the first network connecting unit to perform the network connecting operation, then the network access unit will select to not perform the network connecting operation; and if the first network connecting unit is not capable of connecting network and the second network connecting unit is capable of connecting network, then the network access unit will select the second network connecting unit to perform the network connecting operation; if the first network connecting unit and the second network connecting unit are not capable of connecting network, then the network access unit will select to not perform the network connecting operation.

9. The electronic device of claim 1, wherein the first network transmission specification is Ethernet, and the second network transmission specification is high definition multimedia interface (HDMI) ethernet channel (HEC).

10. The electronic device of claim 1, wherein the network access unit determines to select the first network connecting unit or the second network connecting unit to perform a network connecting operation or to not perform the network connecting operation at least according to a current network connecting status of the network access unit and the detecting result.

11. A network auto-switching method utilized in an electronic device, wherein the electronic device comprises: a first network connecting unit having a first network transmission specification; a second network connecting unit having a second network transmission specification different from the first network transmission specification; and a detecting unit coupled to the first network connecting unit and the second network connecting unit, and the network auto-switching method comprises:
utilizing the detecting unit to detect network connecting statuses of the first network connecting unit and the second network connecting unit to generate a detecting result;
utilizing a network access unit to determine to select the first network connecting unit or the second network connecting unit to perform a network connecting operation or to not perform the network connecting operation at least according to the detecting result; and
utilizing a processing unit to adjust at least one network setting parameter of the network access unit;
wherein the step of utilizing the network access unit to determine according to the detecting result comprises: utilizing the network access unit to determine to select the first network connecting unit or the second network connecting unit to perform the network connecting operation or to not perform the network connecting operation according to the detecting result and the at least one network setting parameter, and the at least one network setting parameter comprises: a current connection priority parameter, a priority selecting connection parameter, and a fixed selecting connection parameter; when the current connection priority parameter has a first current connection priority setting value, the network access unit will not select the current selected first network connecting unit or the current selected second network connecting unit with priority; when the current connection priority parameter has a second current connection priority setting value, the network access unit will select the current selected first network connecting unit or the current selected second network connecting unit with priority; when the priority selecting connection parameter has a first priority selecting connection setting value, the network access unit will select the first network connecting unit with priority; when the priority selecting connection parameter has a second priority selecting connection setting value, the network access unit will select the second network connecting unit with priority; when the fixed selecting connection parameter has a first fixed selecting connection setting value, the network access unit will select the first network connecting unit fixedly; and when the fixed selecting connection parameter has a second fixed selecting connection setting value, the network access unit will select the second network connecting unit fixedly;

when utilizing the network access unit to determine to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the first current connection priority setting value and the first priority selecting connection setting value, if the first network connecting unit and the second network connecting unit both are capable of connecting network, then utilizing the network access unit to select the first network connecting unit to perform the network connecting operation; if the first network connecting unit is capable of connecting network and the second network connecting unit is not capable of connecting network, then utilizing the network access unit to select the first network connecting unit to perform the network connecting operation; if the first network connecting unit is not capable of connecting network and the second network connecting unit is capable of connecting network, then utilizing the network access unit to select the second network connecting unit to perform the network connecting operation; and if the first network connecting unit and the second network connecting unit are not capable of connecting network, then utilizing the network access unit to select to not perform the network connecting operation.

12. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the first current connection priority setting value and the second priority selecting connection setting value, if the first network connecting unit and the second network connecting unit both are capable of connecting network, then utilizing the network access unit to select the second network connecting unit to perform the network connecting operation; if the first network connecting unit is capable of connecting network and the second network connecting unit is not capable of connecting network, then utilizing the network access unit to select the first network connecting unit to perform the network connecting operation; if the first network connecting unit is not capable of connecting network and the second network connecting unit is capable of connecting network, then utilizing the network access unit to select the second network connecting unit to perform the network connecting operation; and if the first network connecting unit and the second network connecting unit are not capable of connecting network, then utilizing the network access unit to select to not perform the network connecting operation.

13. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the first current connection priority setting value and the first fixed selecting connection setting value, if the first network connecting unit and the second network connecting unit both are capable of connecting network, then utilizing the network access unit to select the first network connecting unit to perform the network connecting operation; if the first network connecting unit is capable of connecting network and the second network connecting unit is not capable of connecting network, then utilizing the network access unit to select the first network connecting unit to perform the network connecting operation; if the first network connecting unit is not capable of connecting network and the second network connecting unit is capable of connecting network, then utilizing the network access unit to select to not perform the network connecting operation; and if the first network connecting unit and the second network connecting unit are not capable of connecting network, then utilizing the network access unit to select to not perform the network connecting operation.

14. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the first current connection priority setting value and the second fixed selecting connection setting value, if the first network connecting unit and the second network connecting unit both are capable of connecting network, then utilizing the network access unit to select the second network connecting unit to perform the network connecting operation; if the first network connecting unit is capable of connecting network and the second network connecting unit is not capable of connecting network, then utilizing the network access unit to select to not perform the network connecting operation; if the first network connecting unit is not capable of connecting network and the second network connecting unit is capable of connecting network, then utilizing the network access unit to select the second network connecting unit to perform the network connecting operation; and if the first network connecting unit and the second network connecting unit are not capable of connecting network, then utilizing the network access unit to select to not perform the network connecting operation.

15. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the second current connection priority setting value and the first priority selecting connection setting value, if the first network connecting unit and the second network connecting unit both are capable of connecting network and the network access unit is currently selecting the second network connecting unit to perform the network connecting operation, then utilizing the network access unit to continue to select the second network connecting unit to perform the network connecting operation; if the first network connecting unit and the second network connecting unit both are capable of connecting network and the network access unit is not currently selecting the second network connecting unit to perform the network connecting operation, then utilizing the network access unit to select the first network connecting unit to perform the network connecting operation; if the first network connecting unit is capable of connecting network and the second network connecting unit is not capable of connecting network, then utilizing the network access unit to select the first network connecting unit to perform the network connecting operation; if the first network connecting unit is not capable of connecting network and the second network connecting unit is capable of connecting network, then utilizing the network access unit to select the second network connecting unit to perform the network connecting operation; and if the first network connecting unit and the second network connecting unit are not capable of connecting network, then utilizing the network access unit to select to not perform the network connecting operation.

16. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the priority selecting connection parameter, and the current connection priority parameter and the priority selecting connection parameter respectively has the second current connection priority setting value and the second priority selecting connection setting value, if the first network connecting unit and the second network connecting unit both are capable of connecting network and the network access unit is currently selecting the first network connecting unit to perform the network connecting operation, then utilizing the network access unit to continue to select the first network connecting unit to perform the network connecting operation; if the first network connecting unit and the second network connecting unit both are capable of connecting network and the network access unit is not currently selecting the first network connecting unit to perform the network connecting operation, then utilizing the network access unit to select the second network connecting unit to perform the network connecting operation; if the first network connecting unit is capable of connecting network and the second network connecting unit is not capable of connecting network, then utilizing the network access unit to select the first network connecting unit to perform the network connecting operation; if the first network connecting unit is not capable of connecting network and the second network connecting unit is capable of connecting network, then utilizing the network access unit to select the second network connecting unit to perform the network connecting operation; and if the first network connecting unit and the second network connecting unit are not capable of connecting network, then utilizing the network access unit to select to not perform the network connecting operation.

17. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the second current connection priority setting value and the first fixed selecting connection setting value, if the first network connecting unit and the second network connecting unit both are capable of connecting network and the network access unit is currently selecting the second network connecting unit to perform the network connecting operation, then utilizing the network access unit to continue to select the second network connecting unit to perform the network connecting operation; if the first network connecting unit and the second network connecting unit both are capable of connecting network and the network access unit is not currently selecting the second network connecting unit to perform the network connecting operation, then utilizing the network access unit to select the first network connecting unit to perform the network connecting operation; if the first network connecting unit is capable of connecting network and the second network connecting unit is not capable of connecting network, then utilizing the network access unit to select the first network connecting unit to perform the network connecting operation; if the first network connecting unit is not capable of connecting network and the second network connecting unit is capable of connecting network and the network access unit is currently selecting the second network connecting unit to perform the network connecting operation, then utilizing the network access unit to continue to select the second network connecting unit to perform the network connecting operation; if the first network connecting unit is not capable of connecting network and the second network connecting unit is capable of connecting network and the network access unit is not currently selecting the second network connecting unit to perform the network connecting operation, then utilizing the network access unit to select to not perform the network connecting operation; and if the first network connecting unit and the second network connecting unit are not capable of connecting network, then utilizing the network access unit to select to not perform the network connecting operation.

18. The network auto-switching method of claim 11, wherein when utilizing the network access unit to determine to select the first network connecting unit or the second network connecting unit to perform the network connecting operation or to not perform the network connecting operation according to the detecting result, the current connection priority parameter, and the fixed selecting connection parameter, and the current connection priority parameter and the priority selecting connection parameter respectively has the second current connection priority setting value and the second fixed selecting connection setting value, if the first network connecting unit and the second network connecting unit both are capable of connecting network and the network access unit is currently selecting the first network connecting unit to perform the network connecting operation, then utilizing the network access unit to continue to select the first network connecting unit to perform the network connecting operation; if the first network connecting unit and the second network connecting unit both are capable of connecting network and the network access unit is not currently selecting the first network connecting unit to perform the network connecting operation, then utilizing the network access unit to select the second network connecting unit to perform the network connecting operation; if the first network connecting unit is capable of connecting network and the second network connecting unit is not capable of connecting network and the network access unit is currently selecting the first network connecting unit to perform the network connecting operation, then utilizing the network access unit to continue to select the first network connecting unit to perform the network connecting operation; if the first network connecting unit is capable of connecting network and the second network connecting unit is not capable of connecting network and the network access unit is not currently selecting the first network connecting unit to perform the network connecting operation, then utilizing the network access unit to select to not perform the network connecting operation; if the first network connecting unit is not capable of connecting network and the second network connecting unit is capable of connecting network, then utilizing the network access unit to select the second network connecting unit to perform the network connecting operation; and if the first network connecting unit and the second network connecting unit are not capable of connecting network, then utilizing the network access unit to select to not perform the network connecting operation.

19. The network auto-switching method of claim 11, wherein the first network transmission specification is Ethernet, and the second network transmission specification is high definition multimedia interface (HDMI) ethernet channel (HEC).

20. The network auto-switching method of claim 11, wherein the network access unit determines to select the first network connecting unit or the second network connecting unit to perform a network connecting operation or to not perform the network connecting operation at least according to a current network connecting status of the network access unit and the detecting result.

* * * * *